United States Patent [19]

Eickvonder et al.

[11] Patent Number: 5,025,755
[45] Date of Patent: Jun. 25, 1991

[54] APPARATUS FOR BURNING CARBONACEOUS MATERIAL IN A FLUIDIZED BED REACTOR

[75] Inventors: Wolfgang Eickvonder, Nümbrecht; Norbert Passmann, Alfter-Heidgen; Gerhard Thomas, Gummersbach; Peter Tummers, Gummersbach; Hubert Steven, Gummersbach, all of Fed. Rep. of Germany

[73] Assignee: L. & C. Steinmüller GmbH, Gummersbach, Fed. Rep. of Germany

[21] Appl. No.: 378,217

[22] PCT Filed: Nov. 25, 1987

[86] PCT No.: PCT/EP87/00729
§ 371 Date: May 23, 1989
§ 102(e) Date: May 23, 1989

[87] PCT Pub. No.: WO88/04010
PCT Pub. Date: Jun. 2, 1988

[30] Foreign Application Priority Data

Nov. 26, 1986 [DE] Fed. Rep. of Germany ....... 3640377

[51] Int. Cl.$^5$ .............................. B09B 3/00; F22B 1/00
[52] U.S. Cl. ................................... 122/4 D; 110/216; 110/245; 165/104.16
[58] Field of Search ................ 122/4 D; 110/245, 216; 165/104.16

[56] References Cited

U.S. PATENT DOCUMENTS

| 4,165,717 | 8/1979 | Reh et al. | |
| 4,732,113 | 3/1988 | Engstrom | 122/4 D |
| 4,860,693 | 8/1989 | Jarvstrat | 122/4 D |
| 4,879,958 | 11/1989 | Allen et al. | 122/4 D |

FOREIGN PATENT DOCUMENTS

| 358014 | 9/1922 | Fed. Rep. of Germany . |
| 2819996 | 11/1978 | Fed. Rep. of Germany . |
| 3225509 | 3/1983 | Fed. Rep. of Germany . |
| WO86/04403 | 7/1986 | PCT Int'l Appl. . |

Primary Examiner—Edward G. Favors
Attorney, Agent, or Firm—Robert W. Becker & Associates

[57] ABSTRACT

A method and apparatus for burning carbonaceous materials in a fluidized bed reactor comprising a bottom region and a top region, and containing a fluidized bed, with the heat of combustion being dissipated at least via wall cooling surfaces, and comprising a recirculation system, including a labyrinth separator for recirculating the separated solids to the bottom region of the fluidized bed reactor. The solids are separated from the rising flow of flue gas by the labyrinth separator, which is disposed directly in the top region of the fluidized bed reactor, and are conveyed in the reactor itself along the wall cooling surfaces and are supplied to the bottom region of the reactor, either freely or in closed or partly or completely open recirculation passages. The main area of application is with a steam generator.

14 Claims, 3 Drawing Sheets

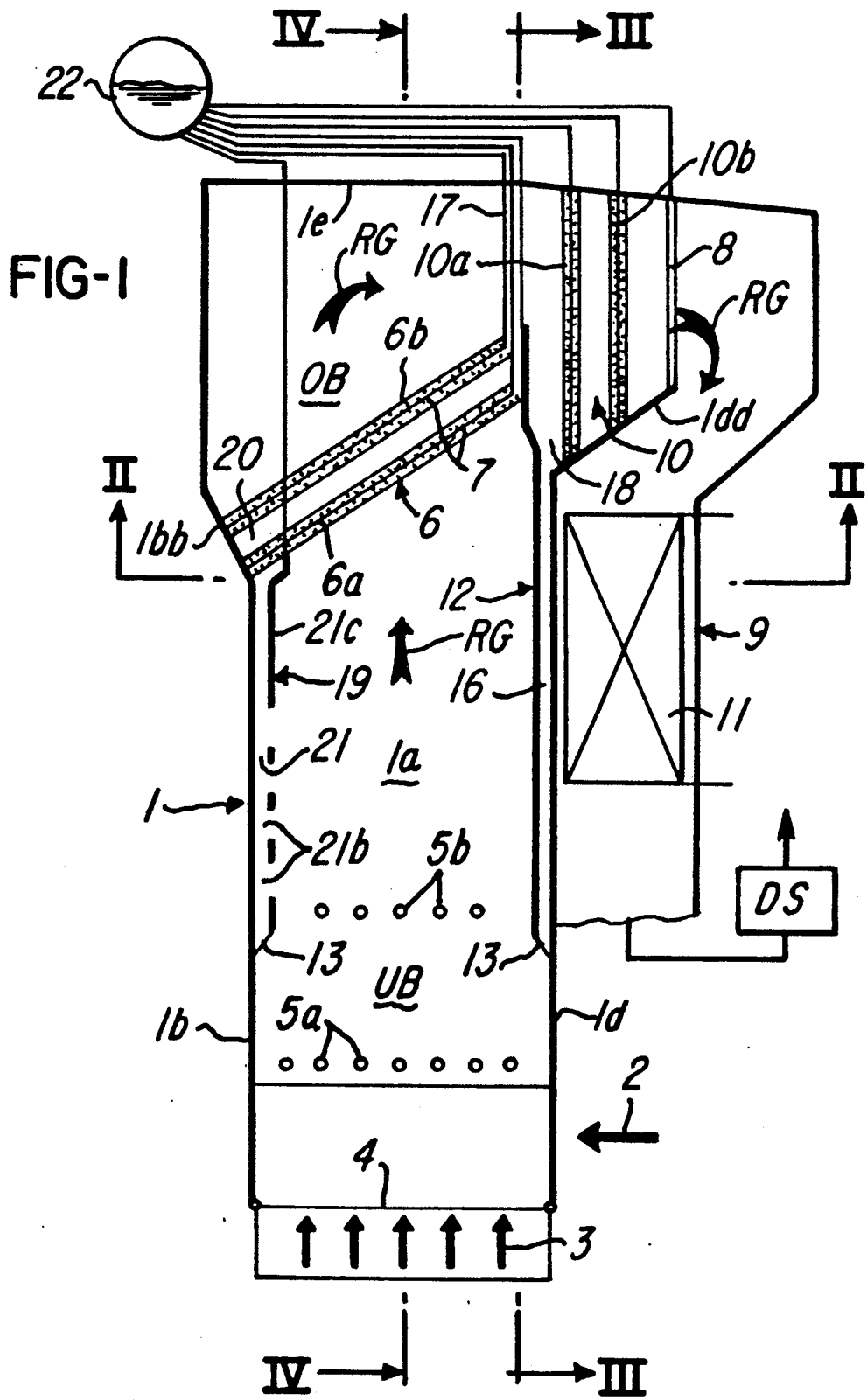

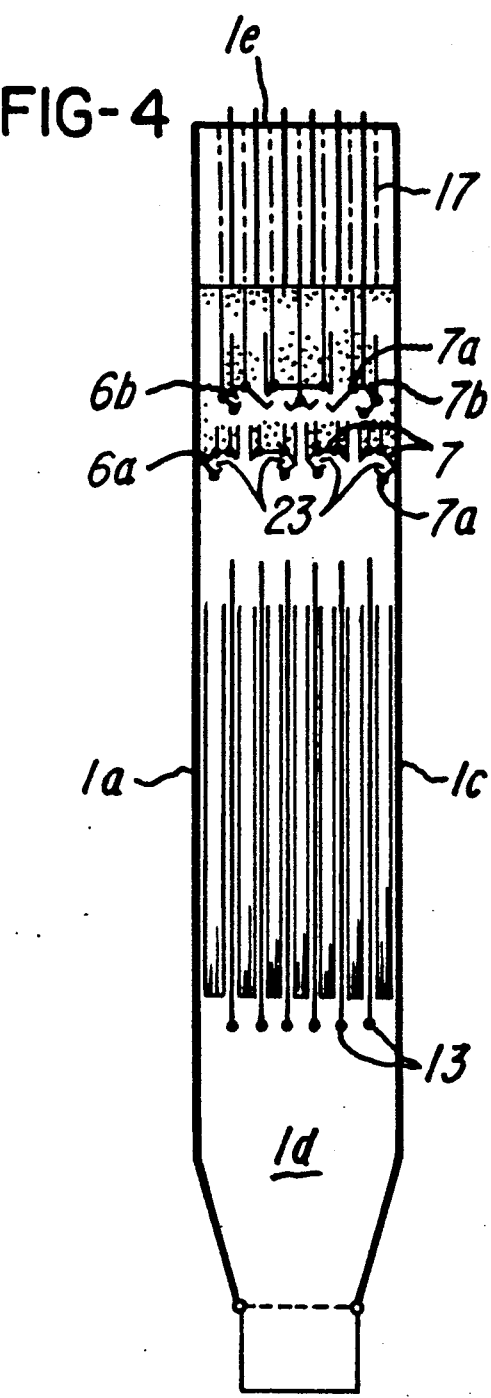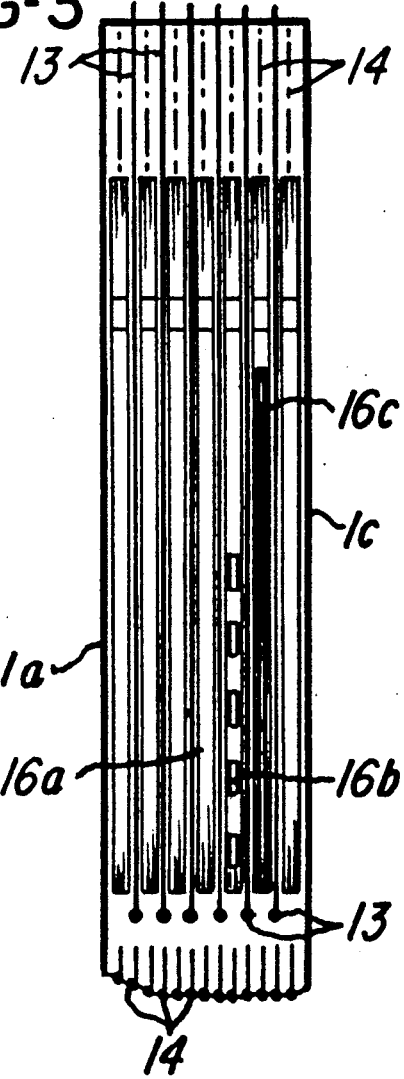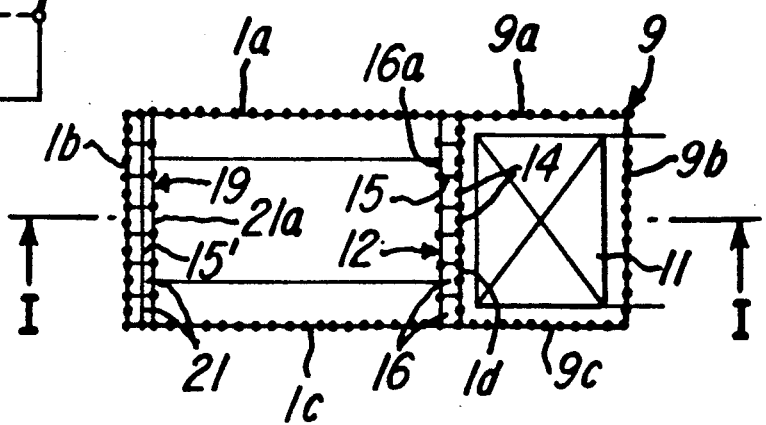

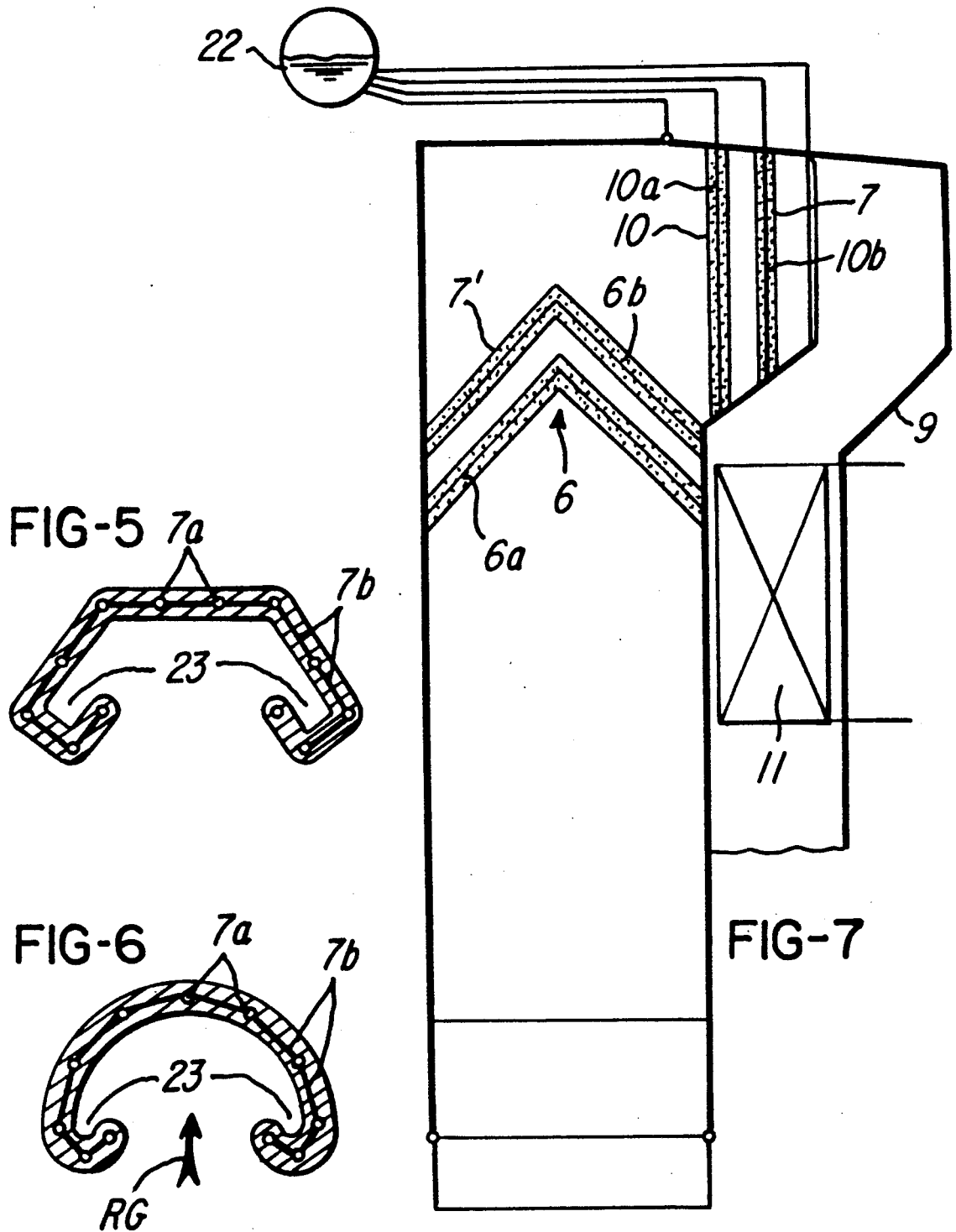

APPARATUS FOR BURNING CARBONACEOUS MATERIAL IN A FLUIDIZED BED REACTOR

BACKGROUND OF THE INVENTION

The present invention relates to a method and apparatus for burning carbonaceous material in a fluidized bed reactor that includes: a bottom portion; a top portion; wall cooling surfaces; a recirculation or return system that includes at least one labyrinth separator which serves for the return of separated-off solid material to the bottom portion and is provided with staggered beams that have an essentially U-shaped cross-sectional configuration and are open toward a rising flow of flue gas; a fuel supply, a fluidizing air supply, and a secondary air supply in the bottom portion; and at least one dust separator disposed downstream of the at least one labyrinth separator.

WO 83/03294 discloses a boiler having a circulating fluidized bed; the fuel is introduced into a fluidized bed reactor which is free of baffles and has wall cooling surfaces. The flue gas, which is charged with solids, is deflected through 90° and leaves the fluidized bed reactor at the top end thereof and flows along a horizontal flue-gas line to a descending flue. The gas is then again deflected substantially through 90° and enters a rising flue in which convective heating surfaces are disposed.

A non-centrifugal mechanical separator in the form of a labyrinth separator is disposed in the connecting line and in the descending flue. The separator elements in the connecting line extend substantially vertically, and the solid material separated by them is conveyed to a storage chamber disposed between the fluidized bed reactor and the descending flue. The separator elements in the descending flue slope down towards the storage chamber, so that the solids separated by them can likewise be supplied thereto. The bottom end of the storage chamber is connected by a number of "L-valves" to the bottom portion of the fluidized bed reactor, so that the solids deposited in the storage chamber can be recirculated in a controlled manner, by means of a fluidizing device associated with the L-valve, to the bottom region of the reactor above the valve tray therein. In WO 83/03294, as in the present specification and claims, the term "labyrinth separator" means a separator where separation occurs through gravity and/or momentum, i.e. without centrifugal force. In the known boiler, staggered lines or chutes are used that extend substantially transverse to the flow of flue gas and that open toward it in a substantially U-shape.

The disadvantage of the known boiler is that the storage chamber, which is disposed outside the reactor, together with one or more L-valves connected downstream, are necessary for the recirculation system, which is external; i.e. separate ash lines and corresponding conveying and regulating equipment are needed.

It is therefore an object of the present invention to provide a method where it is no longer necessary to remove the solids from the fluidized bed reactor.

SUMMARY OF THE INVENTION

To this end, according to the invention, the labyrinth separator, which is disposed directly in the top region of the fluidized bed reactor, separates the solids from the rising flow of flue gas and supplies them in the fluidized bed reactor itself, along the wall cooling surfaces, to the bottom region of the reactor.

The result is to simplify the recirculation or return of solids to the furnace or firing unit.

The separated solids can advantageously be recirculated along the exposed wall cooling surfaces without further protection against the rising flue gases, or alternatively the separated solids can be recirculated via recirculation lines or passages formed in the reactor; the passages can be closed-off by a wall from the reactor interior, or preferably can be partly or completely open, leaving only web-like side walls in the latter case. The partial opening can be in the form of a longitudinally slotted outer wall or an outer wall that is provided with apertures disposed in lines.

Advantageously also, the recirculation passages terminate in the bottom region in the area of operation of the secondary air supply, so that the introduced solids are thoroughly mixed with the other fluidized bed material and the temperature is correspondingly equalized, since the solids recirculated along the wall have been appropriately cooled.

In the boiler according to WO 83/03294 the labyrinth separator elements are not cooled and consequently, for reasons of thermal expansion, cannot be permanently connected at one end to the wall of the fluidized bed reactor. By contrast, according to an advantageous feature of the present invention the labyrinth separator is cooled.

The invention also relates to an apparatus for burning carbonaceous materials in a fluidized bed reactor comprising a bottom region and a top region, at least with wall cooling surfaces and with a recirculation system including at least one labyrinth separator for recirculating separated solids to the bottom region of the reactor, with a fuel supply, a supply of fluidizing air and a preferably stepped secondary air supply in the bottom region, and at least one dust separator, e.g. a multicyclone or fibrous filter, that is connected behind or downstream of the labyrinth separator.

Advantageously, in the device according to the invention the labyrinth separator is disposed directly in the top region of the fluidized bed reactor and conveys the separated solids to at least one wall cooling surface, along which the solids flow downwardly.

If it is desired to partly or completely prevent the solids that flow down along the wall cooling surface from being influenced by the rising flue-gas flow, a number of downwardly extending recirculation lines or passages are provided on the wall cooling surface and are closed or partly or completely open toward the reactor interior. The chosen construction depends on the permitted or desired extent of influence. As before, preferably the walls of the recirculation passages are cooled.

Starting from the device known from WO 83/03294, comprising a labyrinth separator made up of staggered substantially U-section beams, with the beams opening toward the flow of flue gas, according to an advantageous feature, a substantially U-section guide chute for solids is formed on at least one free arm of the separating beams and opens in the direction of the flow of flue gas, i.e. the opening faces away from the oncoming rising flow of flue gas.

In order to improve the conveying action of the separating beams, according to the invention a substantially U-section guide chute for solids is formed on at least one free arm of the separating beams and opens in the direction of the flow of flue gas.

According to another feature, starting from the known device, the separating beams have a round cross-section or a cross-section in the form of a polygonal line or course.

Advantageously also, the separating beams comprise pipes that are supplied with a cooling agent and are disposed in a tube-web-tube construction. The tube-web-tube construction can be studded and banked for improved protection against heat and wear. Alternatively, the separating beam can be made of cast iron.

The separating beams, as in WO 83/03294, can extend substantially transversely to the gas flow or at an angle thereto, from one wall to the other. Alternatively, however, the beams can extend like a roof between two opposite wall cooling surfaces.

In order to cool the separating beams and/or the additional boundary surfaces of the recirculation passages, they can be incorporated in the water-steam circuit of a boiler, if the device is operated as a boiler.

Advantageously, the recirculation passages are formed from the wall cooling surface and a recirculation line cooling surface at a distance therefrom and metal plates that extend vertically or perpendicularly between the two cooling surfaces; advantageously, the pipe spacing of the wall cooling surface is smaller than for the recirculation-line cooling surface, since the pipe on the recirculation-line cooling surface is used mainly only to cool the walls, with most of the heat being dissipated via the wall heating surfaces.

BRIEF DESCRIPTION OF THE DRAWINGS

Various embodiments of the invention will now be described in detail with reference to the accompanying drawings, in which:

FIG. 1 is a diagrammatic longitudinal section through a fluidized bed reactor along line I—I in FIG. 2;

FIG. 2 is a horizontal section along line II—II in FIG. 1;

FIG. 3 is a partial longitudinal section through the fluidized bed reactor of FIG. 1, looking in the direction of the arrows III—III;

FIG. 4 is a longitudinal section through the reactor of FIG. 1, looking in the direction of the arrows IV—IV;

FIGS. 5 and 6 are cross-sections through preferred embodiments of separator beams; and FIG. 7 is a longitudinal section comparable to FIG. 1, but without any separate recirculation lines on the inside of the wall cooling surfaces.

DESCRIPTION OF THE PREFERRED EMBODIMENT

As FIGS. 1 to 4 show, a fluidized bed reactor 1 of rectangular cross-section has four wall cooling surfaces $1a$–$1d$ of tube-web-tube or tube-fin-tube construction.

In the bottom portion UB of the fluidized bed reactor, fuel 2 is supplied above a valve tray 4 that is supplied with fluidizing gas 3, and a stepped supply of secondary air $5a$ and $5b$ occurs above the fuel supply 2. As shown in FIG. 4, the cross-section widens from the valve tray 4 to the secondary air supply $5a$.

In the top portion OB, a labyrinth separator 6 is disposed in two offset layers $6a$ and $6b$ of separator beams 7. As FIG. 1 shows, the beams 7 extend obliquely downwards to the wall $1b$, which has connected to the beams 7. The beams are permanently connected to the walls.

As FIGS. 3 and 4 show, the wall $1d$ does not extend up to the top $1e$ of the reactor but has an outward bend $1dd$ that leaves free a gas passage 8 into a descending flue 9 connected behind or downstream of the reactor 1. An additional labyrinth separator 10 disposed in the transition area between the reactor 1 and the flue 9 comprises two layers $10a$ and $10b$ of separator beams 7. The beams extend substantially vertically.

As FIG. 2 shows, the flue 9 is bounded by the wall cooling surface $1d$ and further wall cooling surfaces $9a$–$9c$. At least one contact heating surface 11, e.g. a superheater, is disposed in the flue. A dust separator is disposed in front or downstream of the flue.

As FIGS. 1, 2 and 3 show, a recirculating-line cooling surface 12 of tube-web-tube construction extends at a distance from the wall cooling surface $1d$ and has a larger spacing than does the surface $1d$. The pipes 13 in the recirculating-line cooling surface 12 are connected to pipes 14 in the wall cooling surface $1d$. Metal sheets 15 extending between the cooling surfaces $1d$ and 12 define individual recirculation lines or passages 16.

The passages 16 are open at the bottom end, and the wall 12, in the area of the bent portion $1dd$ of the wall surface $1d$, extends upwardly to such an extent that it carries the ends of the beams 7 of the separator 6 and also allows the gas to flow out at 17 from the reactor into the transition region and consequently to the gas outlet 8. A collecting and distribution funnel 18 is also formed between the wall 12 and the portion $1dd$; the recirculation passages 16 convey the separated solid material from the funnel 18 to the bottom region UB near the secondary air supply $5a$ or $5b$.

In a comparable manner, the wall cooling surface $1b$ is associated with a recirculating-line cooling surface 19 that cooperates with the outwardly bent area $1bb$ to define a collecting and distribution funnel 20, and also defines recirculation lines or passages 21 via the interposition of metal sheets 15.

Those surfaces of the passages 16 and 21 that face the interior of the reactor can be closed $16a$, $21a$, or can be formed with apertures $16b$, $21b$ or with continuous longitudinal slots $16c$; alternatively, they can be completely open, leaving only webs at the side. These possibilities are diagrammatically shown in FIGS. 1 and 3; of course, hybrid embodiments on a reactor wall are also possible.

As FIGS. 4, 5 and 6 show, the beams 7 are also of tube $7a$—web $7b$—tube $7a$ construction. The wall-cooling surface of the reactor 1 and the flue 9, the separator 7, and the recirculating-line cooling surfaces 12 and 19 are incorporated in a water-steam circuit as diagrammatically shown in FIG. 1, which shows a drum 22 and the corresponding pipe systems. The lines leading to the drum thus extend through the openings 17 and 8 and through the widened region in the top left part of the reactor 1 of FIG. 1. The number of lines can be equal to the number of pipes, of can be less if some pipes are combined. The line portions where there is a transverse flow can be additionally protected.

As FIGS. 4, 5 and 6 also show, the beam separators 7 have a substantially U-shaped cross-section and open towards the flue-gas flow RG. A U-shaped chute 23 for guiding solids is disposed at at least one free or projecting arm of the U and opens in the direction of the flue-gas flow; thus facilitating the removal of the solids trapped by the beam 7 into the funnels 18 or 20.

In the embodiment of FIG. 1 the separated solids are protected by the passages 16 and 21 when recirculated or returned, whereas these passages are omitted in the embodiment in FIG. 7. Instead, the separated solids flow down freely along the walls. Alternatively, the recirculating passages can also be omitted from the embodiment of FIG. 1.

The first separator 6 also has roof-shaped separating beams 7' and therefore conveys solid material to two opposite walls 1b, 1d instead of just one wall.

Of course, even when recirculating passages are used, the first separator 6 can be designed in such a way that it supplies solids to two oppositely-disposed walls.

The present invention is, of course, in no way restricted to the specific disclosure of the specification and drawings, but also encompasses any modifications within the scope of the appended claims.

We claim:

1. In an apparatus for burning carbonaceous material in a fluidized bed reactor that includes: a bottom portion; a top portion; wall cooling surfaces; a recirculation system that includes at least one labyrinth separator which serves for the return of separated-off solid material to said bottom portion and is provided with staggered beams that have an essentially U-shaped cross-sectional configuration and are open downwardly toward a rising flow of flue gas; and a fuel supply, a fluidizing air supply, and a secondary air supply in said bottom portion; the improvement wherein:

said staggered beams are disposed directly in said top portion of said fluidized bed reactor in a rising flow of flue gas, are inclined, and guide said separated-off solid material to at least one of said wall cooling surfaces, which define a rector interior and along which said solid material flows downwardly; and said separator beams have free arms, on at least one of which is formed a guide chute that has an essentially U-shaped cross-sectional configuration and serves for the guidance of solid material, with said guide chute opening upwardly in a direction facing away from said rising flow of flue gas, and serving for the removal of solid material collected by associated separator beams.

2. An apparatus according to claim 1, in which said at least one wall cooling surface is exposed.

3. An apparatus according to claim 1, in which a plurality of recirculation passages are provided on said at least one wall cooling surface, with said recirculation passages extending downwardly from said top portion to said bottom portion.

4. An apparatus according to claim 3, in which said recirculating passages are closed toward the interior of said reactor.

5. An apparatus according to claim 3, in which said recirculating passages are partially open toward the interior of said reactor.

6. An apparatus according to claim 3, in which said recirculating passages are completely open toward the interior of said reactor.

7. An apparatus according to claim 3, in which said recirculation passages are defined by further wall cooling surfaces.

8. An apparatus according to claim 3, in which a lower region of said recirculation passages opens out in an effective range of said secondary air supply.

9. An apparatus according to claim 3, in which said separator beams have a round cross-sectional configuration.

10. An apparatus according to claim 3, in which said separator beams have a polygonal cross-sectional configuration.

11. An apparatus according to claim 3, which includes means for cooling said separator beams.

12. An apparatus according to claim 11, in which said separator beams comprise tubes disposed in a tube-web-tube construction, with said tubes being supplied with coolant.

13. An apparatus according to claim 3, in which at least one of said separator beams and said wall cooling surfaces of said recirculation passages are included in a water/steam circuit of a steam generator.

14. An apparatus according to claim 3, in which said recirculation passages are formed by a wall cooling surface, a recirculating-passage cooling surface that is spaced from said wall cooling surface, and by sheets disposed perpendicularly between said wall cooling surface and said recirculating-passage cooling surface.

* * * * *